United States Patent [19]
Odagiri et al.

[11] 3,949,280
[45] Apr. 6, 1976

[54] MINIATURE VARIABLE CAPACITOR AND METHOD OF MANUFACTURE

[75] Inventors: Shigeyoshi Odagiri, Machida; Michio Nuka, Tokyo; Norikatsu Shinba; Mikito Baba, both of Machida; Yoshikatsu Iizuka, Tama, all of Japan

[73] Assignee: Mitsumi Electric Co., Ltd., Chofu, Japan

[22] Filed: Feb. 18, 1975

[21] Appl. No.: 550,766

[52] U.S. Cl. .............. 317/253; 29/25.41; 29/25.42; 317/254; 427/79
[51] Int. Cl.² ...................................... H01G 5/06
[58] Field of Search ........... 317/253, 254; 29/25.41, 29/25.42; 427/79

[56] References Cited
UNITED STATES PATENTS

| 1,337,549 | 4/1920 | Fitzgerald | 317/253 |
|---|---|---|---|
| 1,533,611 | 4/1925 | Respess | 317/253 X |
| 3,854,181 | 12/1974 | Matsuwake | 29/25.41 |

FOREIGN PATENTS OR APPLICATIONS

| 788,614 | 2/1958 | United Kingdom | 317/253 |

*Primary Examiner*—E. A. Goldberg
*Attorney, Agent, or Firm*—Haseltine, Lake & Waters

[57] ABSTRACT

A miniature variable capacitor comprises a stator plate group having a plurality of stator plates stationarily held in mutually spaced-apart state with specific spacing therebetween by spacers interposed between mutually adjacent plates, a rotor plate group having a plurality of rotor plates held integrally and rotatably in mutually spaced-apart state with specific spacing therebetween by spacers interposed between mutually adjacent rotor plates, and a thin film of a dielectric material is formed simultaneously and integrally on the entire exposed surface of all plates and spacers of at least one of the stator plate group and the rotor plate group. Furthermore, one or more elastic spacers are provided at plate supporting parts of at least one of the stator and rotor plate groups, and fine powder is distributed over the surfaces of all plates. At the time of production of the variable capacitor the dielectric material is formed in a thin film state on the entire plate group.

11 Claims, 20 Drawing Figures

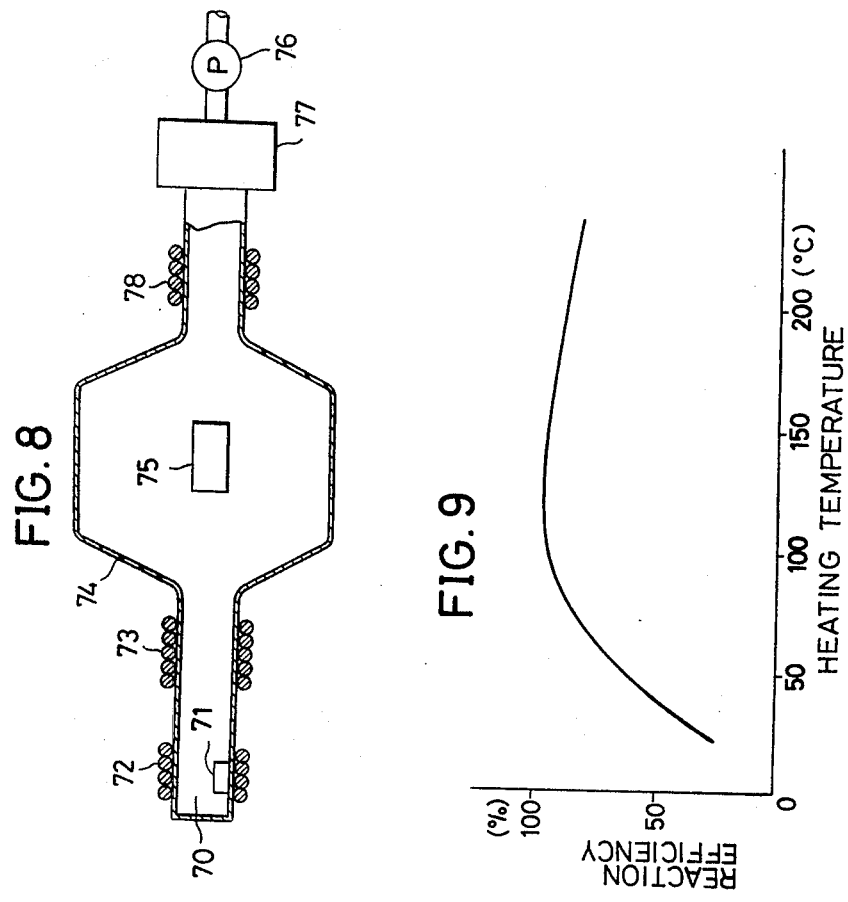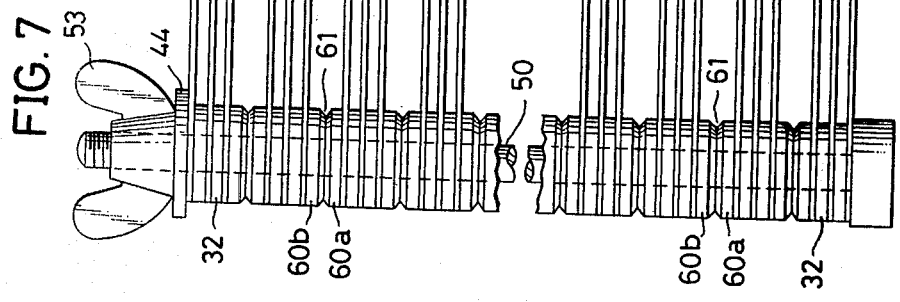

MINIATURE VARIABLE CAPACITOR AND METHOD OF MANUFACTURE

BACKGROUND OF THE INVENTION

This invention relates generally to a miniature variable capacitor and manufacturing method thereof and more particularly to a miniature variable capacitor of a construction wherein the plates are coated with a film of a dielectric material, and, moreover, the spacing between the plates is made small thereby to afford simultaneously miniaturization and large maximum capacitance value. The invention relates also to method for manufacturing this capacitor.

In general, for providing a variable capacitor of large maximum capacitance, the following four approaches are considered.
  a. Decreasing the gaps or clearances between the rotor plates and the stator plates.
  b. Interposing insulating material of high specific inductive capacity between the rotor plates and the stator plates.
  c. Increasing the number of rotor plates and stator plates.
  d. Increasing the mutually facing area of the rotor and stator plates.

By the above approaches (c) and (d) of increasing the number of plates and the mutually facing area of the plates, the variable capacitor is increased in size. Accordingly, these approaches cannot be resorted to when a miniaturization of a variable capacitor is desired. Therefore, in the case where a variable capacitor of large maximum capacitance and, moreover, miniature size is to be designed, the above approaches (a) and (b) are effective.

In resorting to the above approach (a), however, if the spacing between the rotor and stator plates were to be merely made smaller, there would be the possibility of contacting and short-circuiting between the rotor and stator plates and of failure of the capacitor to be formed because of unavoidable errors in dimensional precision, and there is also a limit to decreasing the gaps between the plates.

In one example of a known variable capacitor based on the practice of the above approach (b), sheets of dielectric material which are separate structures from the rotor and stator plates are interposed therebetween. In the assembly of this variable capacitor, however, it is necessary to transfix plate-by-plate the rotor plates on the rotor shaft and the stator plates on the stator support posts in stacked arrangement with spacers interposed between adjacent plates and, at the same time, to transfix the dielectric sheets similarly in interposed position between the plates in laminated arrangement. Consequently, the work of this assembling is extremely troublesome and gives rise to unavoidable inefficiency. Another problem is that this construction requires a large number of parts. Still another difficulty is that, particularly in the case where the dielectric sheets are made thin, and the spacing between the plates is made small, the dielectric sheets are pulled by frictional force arising between these sheets and the rotor plates when the rotor is rotated, and, in extreme cases wherein the rotor is rotated a large number of times, the dielectric sheets are damaged or broken and give rise to malfunctioning or breakdowns.

In another example of a known variable capacitor, dielectric films are caused to adhere to the plates by causing previously prepared dielectric films (sheets) to be melt-bonded to the surfaces of either the rotor plates or the stator plates or both. However, in this variable capacitor, also, the work of melt-bonding the dielectric films on the large number of plates is a laborious operation, and the production cost is high. Partidularly when the dielectric film is thin, the above mentioned melt-bonding work is made further difficult, and the rate of faulty or defective parts becomes high.

Particularly in the case of miniaturization of a variable capacitor, because of factors such as errors in the dimensions of the plates, the rotor shaft, the stator support posts, and other parts and inaccuracies in assembly, a rotor plate rarely exists exactly midway and parallel to the adjacent stator plates. Rather, in most cases in ordinary practice, a plate on one side is displaced toward a plate on the other side and, moreover, is not parallel thereto. Consequently, the plate of one plate group contacts the plate of the other plate group with a certain angle, and, particularly in the case where the spacing between the plates is made small, there arise problems such as the inability of the rotor to rotate smoothly, tendency of the dielectric film to be broken, and tendency of the capacitance to vary with use.

SUMMARY OF THE INVENTION

Accordingly, it is a general object of the present invention to provide a novel and useful variable capacitor of miniature type in which the above described difficulties and problems have been overcome.

A specific object of the invention is to provide a miniature variable capacitor in which there is provided a group of rotor plates and a group of stator plates, and a dielectric film is formed by polymerization reaction in vacuum on the outer surface of each of the plates of at least one of these plate groups. That is, the dielectric film is formed simultaneously on the entire plate group. By this provision, the spacing between the plates can be made extremely small, and variable capacitors can be ultraminiaturized with large capacities. At the same time, the assembly manhours can be reduced, and the manufacturing cost can be lowered.

Another object of the invention is to provide a miniature variable capacitor of construction such that the rotor plates and stator plates can mesh properly with one another without undergoing useless deformation due to contacting. In accordance with the miniature variable capacitor of the invention, of the rotor plates and the stator plates, those of at least one kind are slightly displaceable, whereby the plates can be maintained in a state of proper meshing.

Still another object of the invention is to provide a miniature capacitor in which a fine powder is deposited on the outer surfaces of plates of at least either one of the rotor plates and stator plates. The existence of this fine powder prevents damage to the dielectric film due to direct abrasion of a particular part of the outer surface of one plate by the peripheral edge of another plate.

A further object of the invention is to provide a variable capacitor of ultraminiature size and large capacity in which the magnitudes of undesirable characteristics such as howling, variation in capacitance due to the number of times of use, variation in capacitance due to the charge, capacitance deviation, rotational torque difference, and electrostatic noise are small.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 7 is an enlarged side view for a description of manufacturing of still another embodiment of a stator plate group;

FIG. 8 is a schematic diagram indicating the general organization of one embodiment of apparatus for forming dielectric films on plates;

FIG. 9 is a graph indicating the relationship between the heating temperature and reaction efficiency of the apparatus illustrated in FIG. 8;

DETAILED DESCRIPTION

Figure 1:
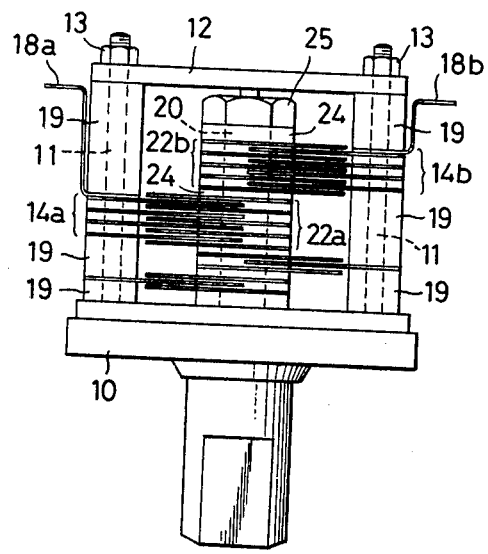
FIG. 1 is a side view of one embodiment of a miniature variable capacitor according to the present invention.

The general construction of one embodiment of a miniature variable capacitor according to the present invention will be described first with reference to FIGS. 1 through 4.

This variable capacitor has a base plate 10 of square shape made of an insulating material and supporting at its four corners respective stator support posts 11 fixed at their root ends to the base plate and extending perpendicularly therefrom. The other ends of the stator support posts 11 support and are connected by a bridge or frame plate 12 secured to the ends of the posts by nuts 13 screwed thereon. On the stator support posts 11, there are supported stator plate groups 14a and 14b (14) each comprising a required number (e.g., four) of plates in laminar stacked arrangement as described hereinafter, each stator plate 15 being of the planar shape shown in FIG. 2B and being supported on two of the stator support posts 11. The stator plate groups 14a and 14b are respectively transfixed together with terminal lugs 18a and 18b on their support posts 11 with these posts inserted through holes 17 formed through ear parts 16 of the stator plates 15 and are positioned by spacer collars 19.

Figure 2A:
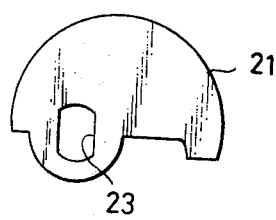
FIGS. 2A and 2B are plan views respectively showing examples of a rotor plate and a stator plate.
Figure 2B:
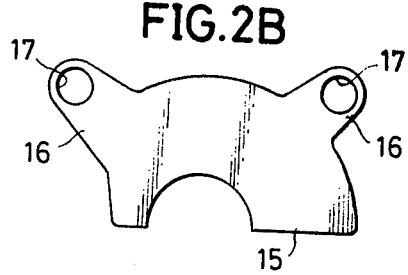
Figure 3:
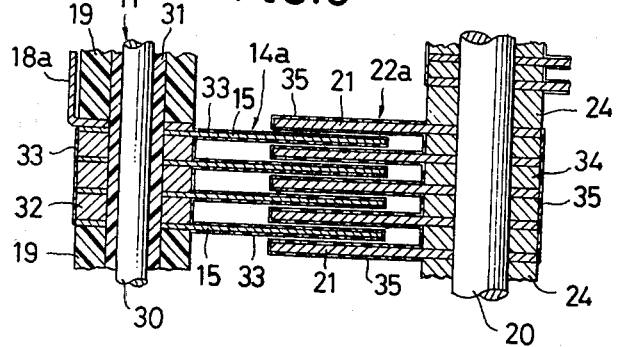
FIG. 3 is a side view, in section, showing an important part of the variable capacitor shown in FIG. 1.

A rotor shaft 20 is extended through and rotatably supported by the insulating base plate 10 at its center. On this rotor shaft 20, there are fixedly supported rotor plate groups 22a and 22b (22) each comprising a required number of rotor plates 21 stacked in laminar arrangement, each rotor plate 21 having a planar shape as shown in FIG. 2A. For this assembly, the rotor plates 21 of the rotor plate groups 22a and 22b are provided with through-holes 23 through which the rotor shaft 20 is inserted and are accurately positioned by spacers 24 so that their respective rotor plates 21 will mesh properly in interposed alignment between corresponding plates 15 of the stator plate groups 14a and 14b. A nut 25 is screwed onto the end of the rotor shaft 20 thereby to fix the rotor plate groups 22 relative to the rotor shaft 20.

The construction of each stator plate group 14 and each rotor plate group 22 will now be described in greater detail. The portions of the stator plate group 14a and the corresponding rotor plate group 22a are shown in enlarged view in FIG. 3. Each stator support post 11 comprises a metal core stem 30 and an insulating sleeve 31 fitted around the core stem 30. Around this insulating sleeve 31, a spacer collar 19, the stator plate group 14a, the lug terminal 18a, and a spacer collar 19 are successively fitted as described briefly hereinbefore.

The spacing between the stator plates 15 of the stator plate group 14a is accurately and positively set and maintained by interposing metal washers (spacers) 32 between adjacent stator plates 15. A feature of the instant variable capacitor is that, exclusive of the surfaces of all stator plates 15 of the stator plate group 14a contacting the washers 32 and contacting the lug terminal 18a and the collars 19, all of the remaining surfaces of the stator plate 15 and the outer peripheral surfaces of the washers 32 are coated integrally with a dielectric film 33 of a specific thickness.

Similarly, the spacing between the rotor plates 21 of the rotor plate group 22a is accurately and positively set and maintained by metal washers (spacers) 34 interposed between adjacent rotor plates. Exclusive of the surfaces of the rotor plates 21 of the rotor plate group 22a contacting the washers 34 and the spacers 24, all of the remaining surfaces of the rotor plates 21 and the outer peripheral surfaces of the washers 34 are coated integrally with a dielectric film 35 of a specific thickness.

Figure 4:
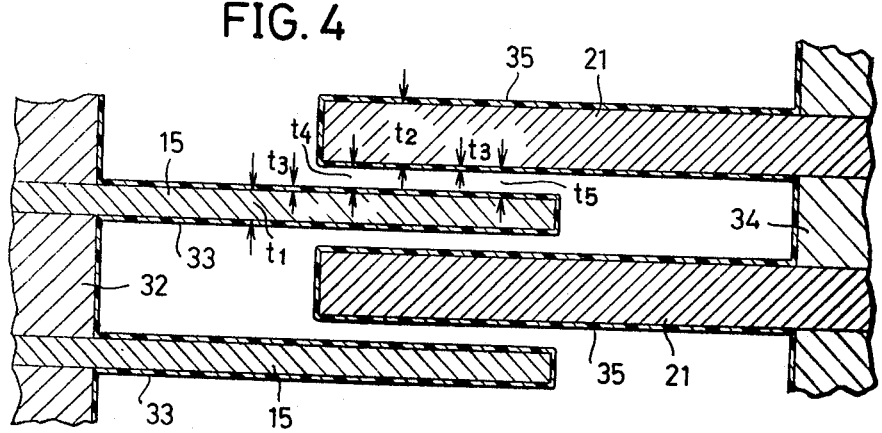
FIG. 4 is a fragmentary, enlarged view, in section, showing a part of FIG. 3.

The dimensional relationships between the rotor and stator plates are as described below with reference to FIG. 4. In the instant embodiment of the miniature variable capacitor according to the invention: the thickness $t_1$ of each stator plate 15 is 0.1 mm.; the thickness $t_2$ of each rotor plate 21 is 0.2 mm.; the thickness $t_3$ of the dielectric films 33 and 35 is 15 $\mu$m; the air gap $t_4$ between the dielectric films 33 and 35 is 10 $\mu$m; and the gap $t_5$ between the plates 15 and 21 is 40 $\mu$m. In this case, the thickness of each washer 32 is 0.28 mm., and that of the washer 34 is 0.18 mm.

In this connection: the desirable range of the thickness $t_3$ of the dielectric films 33 and 35 is of the order of approximately 5 $\mu$m to 20 $\mu$m; that of the air gap $t_4$ between the dielectric films 33 and 35 is of the order of approximately 0 to 20 $\mu$m; and that of the gap $t_5$ between the plates 15 and 21 is approximately 10 $\mu$m to 60 $\mu$m.

Figure 14:
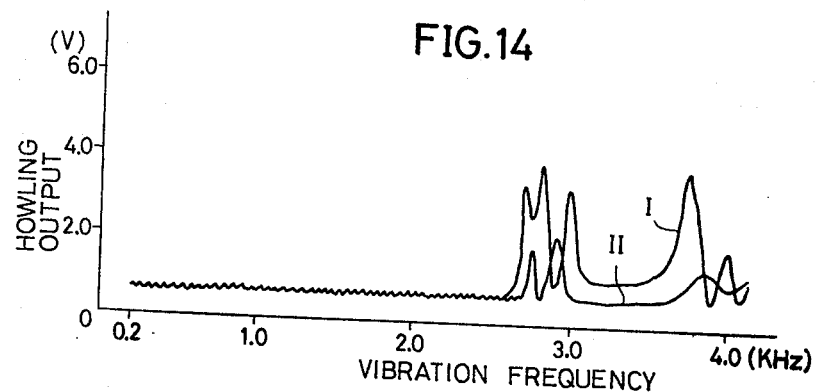
FIG. 14 is a graph indicating the howling output characteristic with respect to vibration frequency of miniature variable capacitor.

As described above, by making the dielectric film thin, the variable capacitor can be constructed with small spacing between the electrodes, and, as a result, howling is reduced. A howling output characteristic with respect to frequency is indicated in FIG. 14, in which curve I indicates the howling output characteristic relating to a conventional variable capacitor, while curve II indicates that relating to a miniature variable capacitor of the invention. As is apparent from a comparison of these curves I and II, the howling relating to the capacitor of the invention with respect to vibration frequencies of particularly 2.5 to 4 KHz is much less.

Next, the method of manufacturing the stator plate group 14 will be described with respect to embodiments.

Figure 5A:
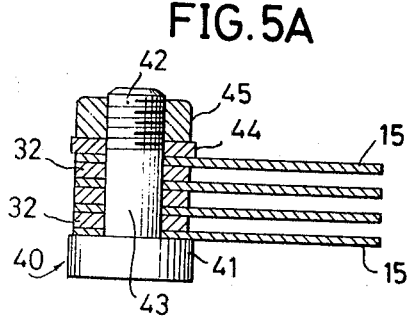
FIGS. 5A and 5B are side views, in section, respectively for descriptions of manufacturing of an embodiment of stator plate groups.

As shown in FIG. 5A, a jig 40 comprising a base flange 41 of a diameter slightly greater than the diameter of the washers 32 and a stem 43 formed integrally with the flange 41 and having a diameter substantially equal to that of the insulating sleeve 31 and a threaded end part 42 is prepared. On and around the stem 43 of this jig 40, stator plates 15 and washers 32 respectively of the required number are fitted alternately and successively and thus transfixed thereon. Then, after a washer 44 of substantially the same diameter as the flange 41 has been fitted and transfixed on the stem 43, a nut 45 is screwed onto the threaded part 42 of the stem 43 and tightened until the plates 15 are properly positioned with the specified spacing therebetween.

Next, as described hereinafter, a dielectric material such as, for example, polyparaxylene, is deposited and formed in vacuum as a thin film of a uniform spacific thickness on the entire structure thus assembled.

Figure 5B:
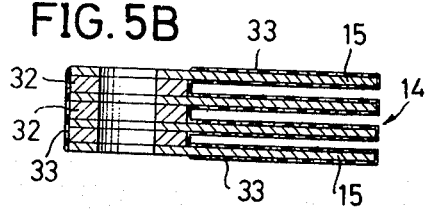

Thereafter, the nut 45 is unscrewed from the threaded part 42 of the stem 43, and the assembly of the stator plates 15 and the washers 32 are removed integrally off the stem 43 of the jig 40, whereupon a stator plate group 14 as shown in FIG. 5B is obtained. Here, with the exception of the contacting surfaces of the stator plates 15 and the washers 32 and the contacting surfaces of the stator plates 15 and the washer 44 and the flange 41, the dielectric film 33 is adhering to and formed integrally over all of the remaining surfaces of the plates 15 and the washers 32. For this reason, the dielectric film 33 increases the dielectric constant between the stator and rotor plates and, moreover, prevents short-circuiting due to direct contact between the plates as a result of the coating of the plates. In addition to thus achieving the original and basic objects thereof, this dielectric film 33 also fulfills the function of holding together all plates 15 and washers 32 as an integral structure. Accordingly, in the assembly of the variable capacitor, it is necessary merely to slip the stator plate group 14 in this integral block state onto the stator support posts 11, whereby the assembly work is greatly facilitated.

Figure 6:
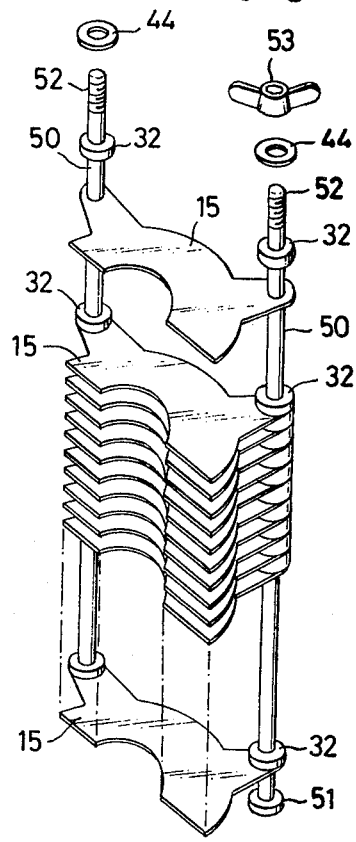
FIG. 6 is a perspective view for a description of manufacturing of another embodiment of a stator plate group.

Another embodiment of method of manufacturing the stator plate group 14 is indicated in FIG. 6. In this process, a pair of rods 50 each having a stop part 51 at one end and a threaded part 52 at the other end are first prepared. On these rods 50 a large number of stator plates 15 and washers 32 are alternately and successively transfixed. Finally, washers 44 are transfixed on the rods 50, and nuts 53 are screwed onto the threaded parts 52 and tightened so that the plates 15 are positioned with proper spacing therebetween.

Thereafter, similarly as in the preceding embodiment, a dielectric film is formed as a coating over the entire assembly. The nuts 53 are then unscrewed off the threaded parts 52, and the rods 50 are extracted from the stator plate group. As a result, a large stator plate group which, as a whole, is an integral structure comprising an alternate alignment of a large number of stator plates and washers is obtained. Then, this structure can be divided into a plurality of stator plate groups 14 each comprising a block of the required number of stator plates and washers. The process of this embodiment is suitable for mass production of a plurality of stator plate groups.

A modification of the embodiment of manufacturing method indicated in FIG. 6 is shown in FIG. 7. In the step of alternately transfixing stator plates 15 and washers 32 on rods 50 in this process, stator plates 15 of a number required for one plate group 14 is transfixed and stacked alternately with interposed washers 32, and then a pair of washers 60a and 60b for interposition between plate groups is fitted on the rods 50. These washers 60a and 60b are beveled around the peripheral edges of their mutually confronting faces, whereby, when these wahsers 60a and 60b are in mutually confronting and contacting state, an annular V-shaped groove 61 is formed therebetween.

Similarly, as in the preceding embodiment, a large number of stator plates 15, interplate washers 32, and intergroup washers 60a and 60b are fitted onto the rods 50, and, with the assembly in this state, a dielectric film is formed as a coating to cover the entire assembly. Thereafter, the rods 50 are extracted. Then, a tool is pushed into the above mentioned grooves 61 formed by and between the intergroup washers 60a and 60b thereby to separate these washers, whereupon separated stator plate groups 14 are obtained. The grooves 61 facilitate the separation of the washers 60a and 60b and, therefore, of the stator plate groups.

In each of the above described processes, correction plates (not shown) each of a thickness greater than that of each plate may be further fitted on the outer sides of the stator plates 15 on the two sides of each stator plate group 14. In the case where the stator plates are not perpendicular to the aforementioned stem 43 or rods 50, these correction plates accomplish correction to establish perpendicularity therebetween.

The rotor plate groups 22 can be fabricated by a process similar to that of the stator plate groups 14. Therefore, description of this process will be omitted.

Next, the process of forming the above mentioned dielectric film 33 and 35 will be described with respect to one embodiment thereof.

In an apparatus as illustrated in FIG. 8, diparaxylene 71 is placed in a thin film forming chamber 70, heated by a heating furnace 72 to a temperature to 80° to 200°C, and thereby rendered into a gaseous state. The diparaxylene in this gaseous state is further heated by a heating furnace 73 for pyrolysis to approximately 600°C and is then introduced into a thin film forming chamber 74. In this thin film forming chamber 74, an assembly 75 to be coated with thin film comprising plates 15 and washers 32 stacked laminarly and tightened together by means such as nuts 45 or 53 as shown in FIGS. 5A, 6, and 7 have been placed beforehand in a state of normal temperature (below 50°C). On one hand, the interior of this apparatus is being evacuated, by way of a cold trap 77 at approximately − 70°C, by a vacuum pump 76.

The gas which has been heated in the heating furnace 73 to undergo a chemical reaction and rendered into a monomer having a paraxylene radical is introduced into the thin film forming chamber 74 and is formed into a film by polymerization reaction on the outer surface of the assembly 75 to be coated, whereby a thin film of polyparaxylene is formed rigidly with uniform thickness on the outer surface of this assembly 75.

In addition, a heating device 78 is provided between the thin film forming chamber 74 and the cold trap 77 for the purpose of heating again the gas drawn into the cold trap 77 by the vacuum pump 76 to a temperature of 50° to 180°C. For this reason, a portion of this heated gas does not flow to the cold trap 77 but returns toward the assembly 75 to be coated with thin film and adheres thereto as a film, and the reaction efficiency is greately improved over that in the case where the heating device 78 is not used. The relationship between the heating temperature of this heating device 78 and the reaction efficiency is indicated in FIG. 9. In this connection, the heating device 78 may be provided in a part of the film forming chamber 74.

Instead of diparaxylene, a substitution product may be used in a part thereof, in which case a thin film of the substitution product is obtained in the same manner. Furthermore, the dielectric material need not be limited to that in the above described embodiment. That is, a synthetic resin substance which has, for example, a specific inductive capacity $\epsilon$ of the order of approximately 1.0 to 5.0, a dielectric loss tan $\delta$ of the order of approximately $1 \times 10^{-4}$ to $5 \times 10^{-2}$, a volume resistivity greater than approximately $10^9$ ohm.cm., and a hygroscopic degree less than approximately 3 percent and, moreover, can be deposited as a film by vacuum forming as described above is suitable for use in accordance with the invention.

By coating each stator plate group and each rotor plate group entirely with a dielectric film as described above, there is little possibility of mutual contacting of the rotor and stator plates to cause short-circuiting when the plate groups are assembled into a variable capacitor. Accordingly, the spacing between these plates can be made very small. Moreover, since dielectric films of high specific inductive capacity are interposed between the plates, the capacitor can be miniaturized to a great degree and, moreover can be made to have a high capacitance. Furthermore, since each plate group is already coated with a dielectric film and thus rendered into an integral structure, the assembly work is greately simplified.

Thus, an ultraminiaturized variable capacitor of large capacitance can be readily produced in accordance with the invention as described above, but in actual production, irregular deviations in the mechanical dimensional accuracy of various parts accompanying the ultraminiaturization are no longer negligible. Consequently, while the relationship between the stator plates 15 and the rotor plates 21, ideally, is as indicated in FIG. 4, it is not realized in actual production, and of the rotor plate and stator plate groups in actual practice, either one or the other becomes offset relatively toward the other.

Figure 10:
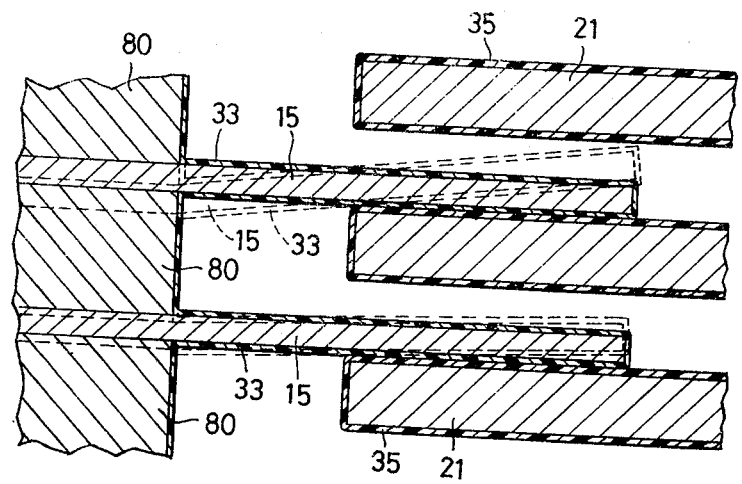
FIG. 10 is an enlarged side view, in section, showing an essential part of a miniature variable capacitor for a description of the effect of correction of plate deflection in the case where an elastic material is used for washers between plates.

For this reason, the stator plates 15 become no longer parallel to the rotor plates 21 as indicated by intermittent line in FIG. 10, and in some extreme cases, the stator plates 15, for example, become bent at their root or proximal parts. Furthermore, when the plates are in this state, the dielectric film 33 of the stator plates 15 is in a state of line contact or point contact with the dielectric film 35 of the rotor plates 21. Consequently, if the rotor plates 21 in this state were to be rotated several times, the dielectric films at the above mentioned contact parts would be easily damaged, and the electrostatic capacity of the capacitor would change. At the same time, there would be the possibility of ultimate direct contact between the plates and consequent short-circuiting.

Accordingly, the present invention overcomes this problems in the following manner.

Referring to FIG. 10, the washers 80 between the stator plates 15 are formed from an elastic structure such as a leaf spring in the form of a spring washer or a rubber-like substance. For this reason, there are irregular deviations in the positions and spacings mutually between the plates 15 of the stator plate group 14, and, if forces act to cause deformation as indicated by intermittent line, the washers 80 will elongate or contract, and the stator plates 15 will be displaced so as to be in a state of surface contact with corresponding rotor plates 21 through the interposed dielectric films 33 and 35 as indicated by full line in FIG. 10.

As a result, deformation of the plates is prevented, and, furthermore, since the dielectric films are not subjected to concentrated local stress, they are not easily damaged, whereby variations in electrostatic capacitance of the capacitor and short-circuiting mutually between plates are also prevented.

While, in the above described embodiment, the washers between the plates 15 of the stator plate group 14 are formed from an elastic material, the washers between the plates 21 of the rotor plate group 22 may be formed from an elastic material instead, or in conjunction with the elastic washers of the stator plate group 14.

Figure 11A:
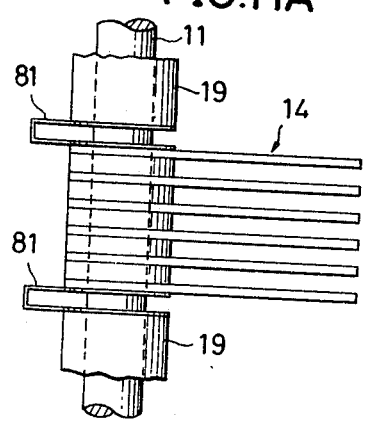
FIGS. 11A and 11B are respectively a side view of one embodiment of the case where elastic washers are used on a support post for stator plates and a perspective view of an elastic washer.
Figure 11B:
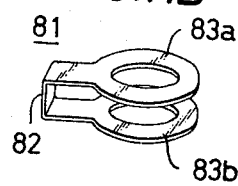

Furthermore, instead of forming the washers between the plates 15 from an elastic material, or in conjunction therewith, elastic washers 81 may be interposed between the stator plate group 14 and the spacer collars 19 for determining the position of the stator plate group 14 as shown in FIG. 11A. As shown in FIG. 11B, each of these elastic washers 81 comprises a pair of washer flanges 83a and 83b and a web part 82 integrally formed therewith and connecting and supporting the washer flanges 83a and 83b in mutually parallel, spacedapart, and coaxial position. These elastic washers 81 are transfixed on the stator posts 11 on opposite sides of the stator plate group 14 and are interposed between the stator plate group 14 and the spacer collars 19 on opposite sides thereof.

Accordingly, in the case where the entire stator plate group 14 is not in appropriate position but is offset relative the entire rotor plate group 22, the elastic washers 81 undergo elastic deformation, whereby the entire stator plate group 14 is displaced so as to be brought into appropriate position relative to the rotor plate group 22.

Figure 12:
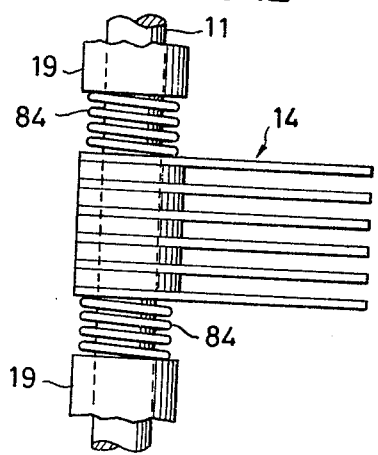
FIG. 12 is a diagrammatic side view showing another embodiment of the use of an elastic material on a support post for stator plates.

Alternatively, instead of the elastic washers 81, coil springs 84 may be interposed between the stator plate group 14 and the spacer collars 19 on opposite sides thereof as shown in FIG. 12. The functional effectiveness of these coil springs 84 is the same as that of the above described embodiment.

Furthermore, by inserting elastic washers between the stator plate groups at the time of fabrication of the stator plate groups described hereinbefore in conjunction with FIGS. 6 and 7, any deviating deflection of plates during the process of fabricating the stator plate groups 14 can be corrected by these elastic washers, and, moreover, when these washers are inserted in the assembly of the variable capacitor, correction to the appropriate position of the stator plate group can be accomplished as described above.

Still another feature of the invention is the manner in which the aforementioned problems accompanying ultraminiaturization are solved as described below.

Figure 13:
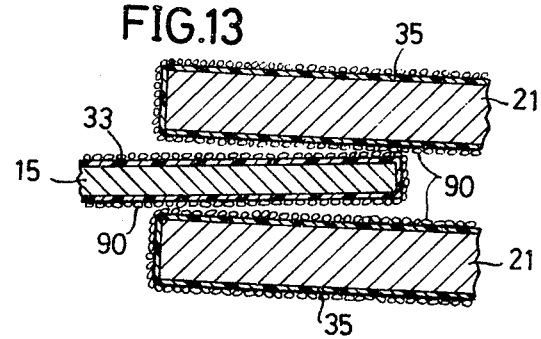
FIG. 13 is a fragmentary, enlarged, sectional view of a miniature variable capacitor in a state wherein a fine powder is deposited on the surfaces of plates.

As shown in FIG. 13, particles of fine powder 90 are distributed over the surfaces of the dielectric film 35 of the rotor plates 21 and the surfaces of the dielectric film 33 of the stator plates 15.

In the instant embodiment, the particles of the fine powder 90 have a particle diameter $d$ of approximately 5 $\mu$m, a specific inductive capacity $\epsilon$ of 2.5 (at $10^6$ Hz), a dielectric loss tan $\delta$ of $2 \times 10^{-4}$, a volume resistivity of $10^{-4}$ ohm.cm., and a hygroscopic degree of 0.3 percent. The limits or ranges of these various properties of the fine powder 90 are as follows. The particle diameter $d$ must be less than the air gap between the plates, preferably less than one half thereof. The other ranges are, preferably: specific inductive capacity $\epsilon$, approximately 1.0 to 5.0 (at $10^6$ Hz); dielectric loss tan$\delta$, approximately $1 \times 10^{-4}$ to $5 \times 10^{-2}$; volume resistivity, approximately $10^9$ to $10^{15}$ ohm.cm.; and hygroscopic degree, approximately 0.1 to 3 percent. Examples of substances having these properties are powders of synthetic resins such as ethylene tetrafluoride, polyethylenes, and polycarbonates. The powder to be used in the practice of the invention is selected from these powders.

This fine powder 90 can be distributed over the surfaces of all plates, for example, by causing the particles of the powder to be wafted in an air stream and blowing the same against all plate groups. By this procedure, the fine powder 90 can be caused to disperse and be deposited over the entire surfaces of all plates.

As a result of the presence of this fine powder 90, the dielectric film 33 of each stator plate 15 and the dielectric film 35 of the confronting rotor plate 21 are in a state wherein the particles of the fine powder 90 are interposed therebetween and are not in direct sliding contact with each other. For this reason, abrasive wear due to mutual rubbing of the dielectric films is prevented. Furthermore, since the fine powder particles act as rolling balls, the torque required for turning the rotor plate group is also reduced.

Still another beneficial effect of the presence of the fine powder 90 between the mutually confronting dielectric films 33 and 35 is that, even if the stator plates and rotor plates are in a nonparallel state, damage to the dielectric films 33 and 35 due to local, concentrated rubbing contact therebetween will be prevented, whereby undesirable occurrences such as capacitance variation and short-circuiting between the plates due to a large number of rotations of the rotor during use can be effectively prevented.

The above described use of the elastic washers (spacers) and the use of the fine powder respectively have the following beneficial effects on various characteristics of the variable capacitor. In this connection, the characteristics of a miniature variable capacitor in which elastic washers and fine powder are used together will be described with respect to a comparison thereof with those of a miniature variable capacitor in which these elastic washers and powder are not used. In each of FIGS. 15, 16, and 17, curve I indicates a characteristic of the variable capacitor in which elastic washers and the fine powder are not used, while curve Ii indicates the corresponding characteristic of a miniature variable capacitor in which the elastic washers and fine powder are used in accordance with the present invention.

Figure 15:
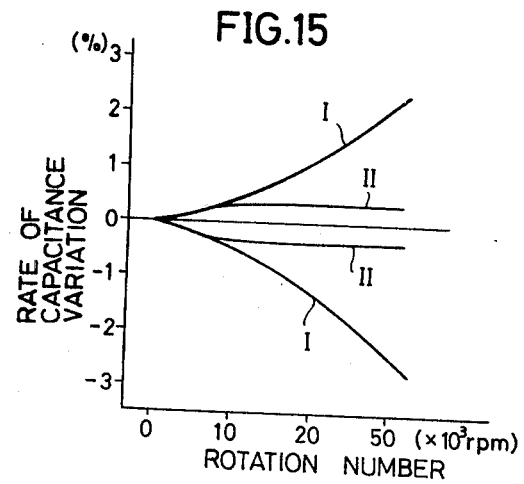
FIG. 15 is a graph indicating the rate of capacitance variation with respect to number of times of rotation of the rotor of a miniature variable capacitor.

FIG. 15 indicates the rate of variation of capacitance with the number of rotations of the rotor. With respect to the number of rotations of the rotor, the rate of variation of capacitance deviates respectively within the ranges between curves I, I and between curves II, II. As is apparent from these ranges, by using the elastic washers and fine powder as described above, the absolute value of the rate of capacitance variation becomes very small, and there is almost no variation of capacitance even after use through a large number of rotor rotations.

Figure 16:
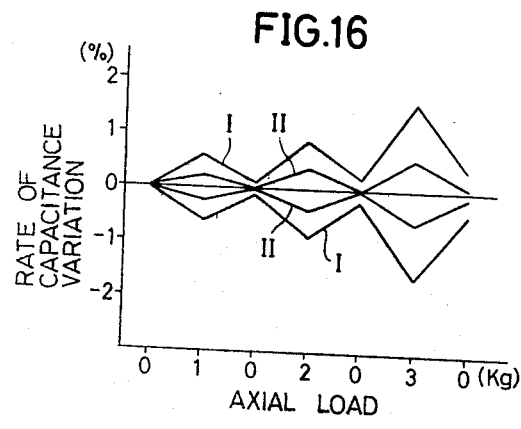
FIG. 16 is a graph indicating the rate of capacitance variation with respect to axial load of a miniature variable capacitor.

FIG. 16 indicates the capacitance variation rate characteristic in the case where application of a load on the rotor shaft in the axial direction and removal of this load are alternately carried out, and, moreover, this load is progressively increased. The capacitance variation rates in the two capacitors deviate respectively within the ranges between curves I, I and between curves II, II. In the case of curve I, the absolute value of the capacitance variation rate is large, and, moreover, when the load is removed, the capacitance variation rate does not return to zero. In contrast, in the case of curve II, the absolute value of capacitance variation rate is small, and, moreover, when the load is removed, the capacitance variation rate becomes substantially zero, and no hysteresis remains.

Figure 17:
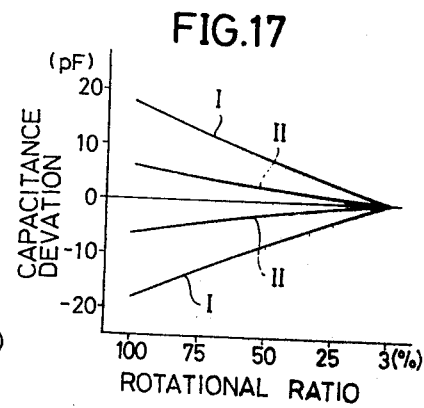
FIG. 17 is a graph indicating the capacitance deviation characteristic with respect to rotational ratio of a miniature variable capacitor.

FIG. 17 indicates capacitance deviation characteristic with respect to rotational ratio (rotational angle of the rotor expressed in percent when a rotation of 180° of the rotor is taken as 100 percent). With respect to the rotational reading, the capacitance deviation deviates respectively within the ranges between the curves I, I and between the curves II, II. As is apparent from this result, by the use of the elastic washers and the fine powder, the capacitance deviation can be made very small.

Furthermore, with respect to rotational torque required for turning the rotor shaft, while not shown, the difference between the maximum and minimum torques is of the order of, for example, 120 to 170 gram.cm. in the case where the above described measures have not been effected, whereas, according to our findings, it is reduced to 50 to 80 gram.cm in the case where these measures have been carried out.

With respect to the problem of electrostatic noise, moreover, the number of defective products rejected for excessive electrostatic noise was of the order of 15 out of 10,000 produced in the case where the above described measures were not taken, whereas the corresponding number was almost zero in the case where the measures were taken.

It should be understood, of course, that the foregoing disclosure relates to only preferred embodiments of the invention and that it is intended to cover all modifications of the embodiments herein chosen for the purposes of illustration which do not constitute departures from the spirit and scope of the invention. For example, the dielectric film may be formed on only the plates of the rotor plate group and not on the plates of the stator plate group.

What is claimed is:

1. A miniature variable capacitor comprising:
    a stator plate group comprising a plurality of stator plates fixedly held in mutually spaced-apart state with a specific spacing therebetween determined by spacers interposed between mutually adjacent stator plates;
    a rotor plate group comprising a plurality of rotor plates integrally and rotatably held in mutually spaced-apart state with a specific spacing therebetween determined by spacers interposed between mutually adjacent rotor plates and, moreover, in a freely rotatable state of interposition thereof respectively between said stator plates; and
    a thin film of dielectric material deposited and formed simultaneously and integrally on the entire exposed outer surfaces of all plates and spacers of at least one group of said stator plate group and said rotor plate group.

2. A miniature variable capacitor as claimed in claim 1 in which said dielectric material thin film is formed integrally in thin film state by polymerization reaction on the entire outer surface of said plates and spacers exclusive of the surfaces thereof of mutual contact therebetween.

3. A miniature varialbe capacitor as claimed in claim 1 in which said dielectric material is a substance satisfying the conditions of a specific inductive capacity of the order approximately 1.0 to 5.0, a dielectric loss of the order of approximately $1 \times 10^{-4}$ to $5 \times 10^{-2}$, a volume resistivity of more than approximately $10^9$ ohm.cm., and a hygroscopic degree of less than approximately 3 percent.

4. A miniature variable capacitor as claimed in claim 1 in which the dielectric material is polyparaxylene.

5. A miniature variable capacitor as claimed in claim 1 in which the spacers of at least one group of said stator plate group and rotor plate group are constituted by members having elasticity.

6. A miniature variable capacitor as claimed in claim 1 further comprising a first position determining member for determining the position of said stator plate group, a second position determining member for determining the position of said rotor plate group, and a spacer comprising an elastic material interposed between at least one of said first and second position determining members and the corresponding plate group.

7. A miniature variable capacitor as claimed in claim 1 further comprising fine powder distributed on and over the surfaces of the plates of at least one of said stator plate group and rotor plate group.

8. A miniature variable capacitor as claimed in claim 7 in which said fine powder comprises a substance which has a maximum particle diameter less than the spacing dimension of the air gap between said stator plates and confronting rotor plates, and which substantially satisfies the conditions of a specific inductive capacity of the order of approximately 1.0 to 5.0, a dielectric loss of the order of approximately $1 \times 10^{-4}$ to $5 \times 10^{-2}$, a volume resistivity of the order of approximately $10^9$ to $10^{15}$ ohm.cm., and a hygroscopic degree of the order of approximately 0.1 to 3 persent.

9. A miniature variable capacitor as claimed in claim 1 in which the thickness of said film of dielectric material is selected within a range of the order of approximately 5 $\mu$m to 20 $\mu$m, and the gap between the plate of one plate group and the plate of the other plate group is selected within a range of the order of approximately 10 $\mu$m to 60 $\mu$m.

10. A method of manufacturing a miniature variable capacitor comprising the steps of:
    interposing spacers respectively between mutually adjacent plates of a plurality of stator plates to assemble thereby a stator plate group of said plates in spaced-apart state with a specific spacing therebetween;
    interposing spacers respectively between mutually adjacent plates of a plurality of rotor plates to assemble thereby a rotor plate group of said rotor plates in spaced-apart state with a specific therebetween;
    forming a dielectric material simultaneously and integrally in thin film form by polymerization reaction on the entire exposed surface of the plates and spacers of at least one of said assembled stator plate group and assembled rotor plate group to deposit thereby and form a dielectric thin film on said surface; and
    assembling the variable capacitor so that the stator plate group thus obtained is held stationary and the rotor plate group thus obtained is held in a freely rotatable state with the rotor plates thereof respectively meshed with the stator plates of the stator plate group.

11. A method of manufacturing a miniature variable capacitor as claimed in claim 10 in which the step of depositing and forming a dielectric thin film is a process which is carried out by heating diparaxylene or a substitution product thereof to render thereby the same into a gas, forming a thin film of polyparaxylene by polymerization reaction of said gas on the surface of said plate group disposed within a vacuum chamber, providing a cold trap between said vacuum chamber and a vacuum pump, and applying heat between said vacuum chamber and said cold trap. --

* * * * *